July 23, 1963 H. P. BARASCH 3,098,933
PHOTOSENSITIVE ELECTRONIC TRACKING HEAD
Filed Oct. 23, 1957 2 Sheets-Sheet 2

INVENTOR.
Hans P. Barasch
BY
Franz O. Ohlson, Jr.
ATTORNEY.

United States Patent Office 3,098,933
Patented July 23, 1963

3,098,933
PHOTOSENSITIVE ELECTRONIC
TRACKING HEAD
Hans P. Barasch, New York, N.Y., assignor to Republic Aviation Corporation, Farmingdale, N.Y., a corporation of Delaware
Filed Oct. 23, 1957, Ser. No. 692,959
13 Claims. (Cl. 250—203)

This invention relates in general to tracking devices and more particularly to optical tracking devices.

Among other objects, the present invention contemplates a tracking device embodying means of producing signals indicating the position of an optically preceptible object relative to a reference line or axis within a field of view established by the device.

While the present invention may have general utility, it is particularly suitable for association with the weapons guidance system of an aircraft. When thus utilized, the instant device serves to track a missile launched from the aircraft and to produce signals indicating the missile's position or course of flight relative to a tracking line established by the device, which signals may be then used to direct the missile's flight into coincidence with, or along, the selected tracking line.

With the above and other objects in view as will become apparent this invention consists in the construction, combination and arrangement of parts all as hereinafter more fully described, claimed and illustrated in the accompanying drawings, wherein:

One of the present weapons guidance systems used in aircraft for controlling the flight of a missile launched from the aircraft at a selected target, embodies a conventional or standard sight mounted in the aircraft to establish a line of sight between the aircraft and the target. An optical tracking device is mounted in the aircraft with its optical axis in close parallel relationship with the line of sight to the end that the parallax error therebetween is at a minimum and for all practical purposes they may be considered to be in coincidence. Due to this arrangement when the aircraft is maneuvered to align the sight on the target, thereby establishing a line of sight to the target, the optical axis of the tracking device is also aligned on the target and thereafter may be used as a tracking line or true course along which a guided missile may be directed to the target. A guidance system such as above set forth is shown and described more fully in the co-pending application of Roland C. Grandgent and Thracy Petrides, application Serial No. 521,977, now Patent No. 2,944,763, filed July 13, 1955, and assigned to Republic Aviation Corporation, Farmingdale, Long Island, New York.

The missile used with a guidance system of this type is so positioned on the aircraft that within a relatively short time after it has been launched, the missile comes into the field of view scanned by the tracking device to the end that optical or light rays from a light source such as a flare carried by the missile are received by the tracking device.

The tracking device is constructed and arranged to utilize the optical or light rays received from the missile to produce signals indicating the position of the missile relative to the tracking line established by the device. The position signals thus produced are fed to a suitable computer wherein they are converted into command signals that are transmitted by radio means to the control system of the missile. The command signals are effective to operate the missile's control system so as to direct its flight into agreement with the tracking line thereby placing the missile on a true course toward the target.

The present invention is directed toward a tracking device for use in a weapons system such as above described where it serves to produce signals indicating the missile's position relative to the tracking line of the device. To this end the instant tracking device embodies means for receiving optical or light rays from the missile within selectively scanned fields of view about the optical axis of the device and for converting them into signals indicating the position of the missile relative to this optical axis or tracking line. Moreover, to more readily locate or acquire the missile and to increase the accuracy of tracking after acquisition, the instant device embodies means whereby initially the scanned field of view is relatively large, and thereafter, is narrowed or restricted to a smaller field of view.

Figure 1:
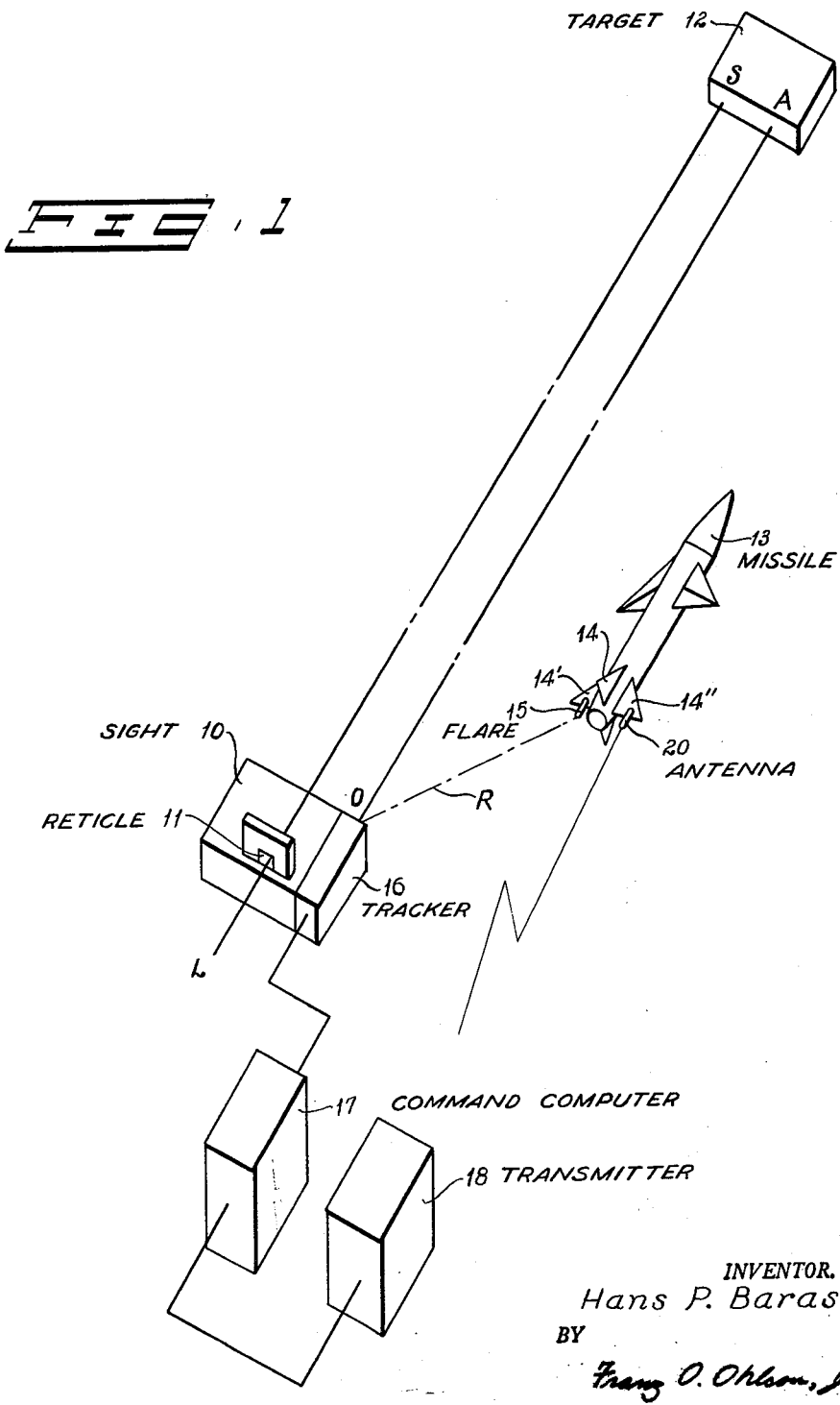
FIG. 1 is a schematic representation of the instant invention associated with the weapons guidance system of an aircraft where it serves to indicate any deviations in the flight of a guided missile launched from the aircraft from a tracking line established between the aircraft and target.

Referring now to the drawings, in particular to FIG. 1, 10 indicates a conventional sight of an aircraft, not shown, having a reticle 11 through which a line of sight L-S is established between the reticle 11 and a distant target 12. In short, the pilot maneuvers the aircraft to align the reticle 11 on the target 12 thereby establishing the line of sight L-S from the pilot's eye, through the recticle 11 to the target 12.

A missile 13, launched from the aircraft toward the target 12, is provided at its aft end with a suitable control assembly 14 including symmetrically disposed fins 14' and 14''. The fin 14' carries a suitable light source such as a flare 15 for emitting selected optical or light rays, for example, the infra-red rays R. The flare 15 is constructed to become operative automatically upon the launching of the missile 13 from the aircraft.

Figure 2:
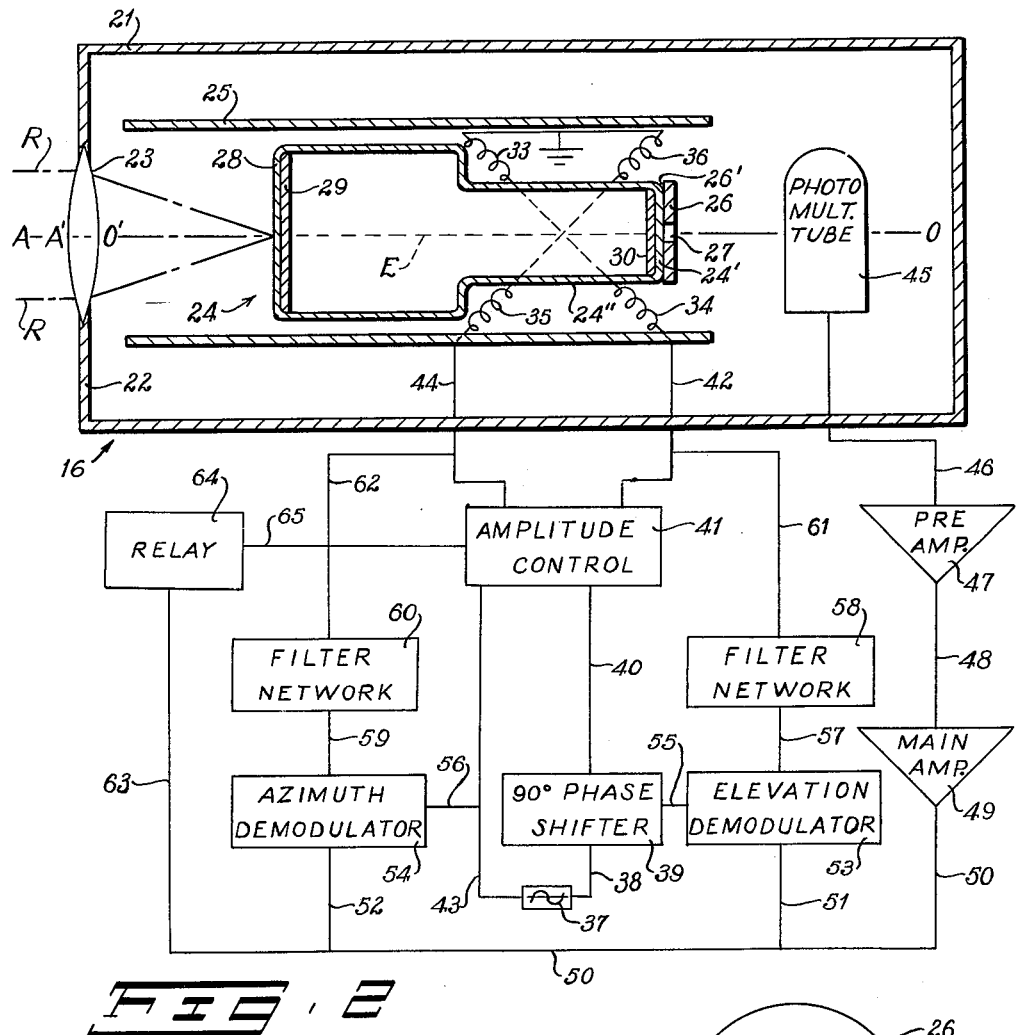
FIG. 2 is a side view partially in section of the tracking device contemplated herein and the electronic circuits associated therewith.

The tracking device 16 contemplated herein is fixedly mounted on or adjacent to the sight 10 with its optical axis O-A, FIG. 2, in close parallel relationship to the line of sight L-S established as aforesaid through the reticle 11 of the sight 10. Due to this arrangement, the parallax error between the line of sight L-S and the optical axis O-A is at a minimum and for all intents and purposes they may be considered to be coincident. Therefore, when the line of sight L-S is established and maintained on the target 12 the optical axis O-A of the tracking device 16 is also established and maintained on the target 12 so that thereafter it may be used as a tracking line or true course along which the missile 13 may be directed toward target 12.

As will hereinafter be more fully set forth, the tracking device 16 is operative to scan a field of view about its optical axis O-A into which the missile 13 appears shortly after it has been launched from aircraft. The light rays R from the source 15 are received by the tracking device 16 and converted into electrical signals indicating the direction of displacement of the missile 13 relative to the optical axis or tracking line O-A. The signals developed by the tracking device 16 are fed to a suitable command computer 17 which converts them into command signals for directing the missile's flight into agreement with the optical axis or tracking line O-A. The signal output of the command computer 17 is fed to a radio transmitter 18 which transmits the command signals to a receiving antenna 20 mounted on the fin 14″ of the stabilizing assembly 14 of the missile 13. The missile 13 is provided with any conventional guidance or control system (not shown) which in response to the command signals operates the control assembly 14 of the missile 13 to direct its flight into agreement with the tracking line O–A to the end that the missile 13 strikes the target 12. Inasmuch as the means for converting and transmitting the signals developed by the tracking device 16 to the missile 13, i.e., the command computer 17 and radio transmitter 18 as well as the guidance or control system of the missile 13 are conventional and form no part of the instant invention, they have not been set forth in detail.

As shown more particularly in FIG. 2, the tracking device 16 comprises a closed box or case 21 having an opening formed through one of its end walls 22 in which an optical system, shown schematically in FIG. 2 as a single lens 23 having an optical axis O′–A′, is mounted to serve as a window through which the light rays R from the flare 15 of the missile 13 pass into the case 21. The optical system 23 may be of any conventional design and construction capable of receiving the light rays R and focusing them at a selected focal plane within the case 21. Moreover, the optical system 23 may include suitable optical filters whereby only selected light rays will be passed and focused thereby.

Figure 3:
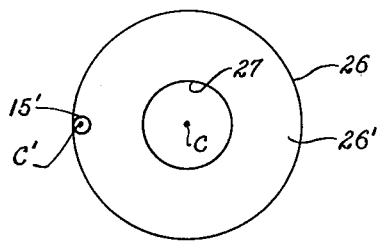
FIG. 3 is a view showing an instantaneous position of the image of a flare carried by the missile as it appears on a diaphragm of the instant device during the acquisition stage of operation.
Figure 4:
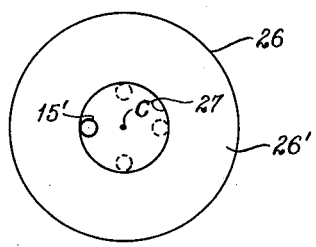
FIG. 4 is a view similar to FIG. 3 showing the image of the flare as it appears on the diaphragm during the tracking stage of operation and when the missile is on course.

The optical axis O–A of the tracking device 16 is established by conventionally mounting within the case 21 behind the optical system 23 and in optical axial alignment with its optical axis O′–A′ as well as with each other, a standard image converter tube 24, housed within a magnetic shield 25, and a diaphragm 26 having a centrally disposed aperture 27. The diaphragm 26 is mounted in any suitable manner within the case 21 with is forward face 26′ disposed in contact with the end 24′ of the converter tube 24 and normal to the optical axis O–A which also passes through the center C (FIG. 3) of the diaphragm aperture 27. Thus the optical axis O–A of the tracking device 16 is coincident with the optical axis O′–A′ of the optical system 23, the longitudinal axis of the image converter tube 24 and the center C of the aperture 27 in the diaphragm 26.

The optical system 23 is so arranged that the light rays R it receives from the flare 15 of the missile 13 are focused as a small dot or disc of light on the receiving face or screen 28 of the image converter tube 24. Moreover, the position of the focused light rays R relative to the optical axis O–A is the same as the position of the flare 15, and hence the missile 13, relative to the optical axis O–A. Thus, if the missile 13 is displaced either in azimuth, elevation, or both from the optical axis O–A, the light rays R from its flare 15 are focused on the screen 28 so as to be similarly displaced from the optical axis O–A.

For the purpose of the following description of the construction and operation of the instant tracking device, it is assumed that the missile 13 has been launched from the aircraft and its flare 15 has just entered the field of view of the optical system 23 from the right and on the horizontal or azimuth axis thereof, i.e., the missile 13 is displaced in azimuth only to the right of the optical axis O–A as shown in FIG. 1. Under these conditions, the optical system 23 focuses the light rays R from the flare 15 on the horizontal or azimuth axis of the receiving face 28 of the image converter tube 24 and to the right of the optical axis O–A.

The image converter tube 24 is of conventional construction with the inner surface of its receiving face 28 coated with a photo-sensitive material 29 having the property of emitting electrons when activated by light as for example the light rays R. Therefore, in response to the focused light rays R, the photo-sensitive coating 29 emits a stream or beam of electrons E that is accelerated and focused by conventional means, not shown, embodied in or forming a part of the image converter tube 24 to impinge upon and activate a fluorescent coating 30 applied to the inner surface of the end wall 24′ of the image converter tube 24. When the fluorescent coating 30 is activated by the electron beam E, a small disc of light is produced on the end wall 24′ that appears on the forward face 26′ of the diaphragm 26 in the form of the flare image 15′ having a center C′. In this instance, the center C′ of the flare image 15′ is disposed to the right of the center C of the aperture 27 in the diaphragm 26 at a distance proportional to the displacement of the focused light rays R from the optical axis O–A as it passes through the receiving face 28 of the tube 24. This displacement of the flare image 15′ is occasioned by the normal operation of the image converter tube 24. Therefore, under these conditions, i.e., where the missile 13 and its flare 15 are displaced in azimuth only and to the right of the optical axis O–A, the optical system 23 and the image converter tube 24 cooperate to produce a light image 15′ of the missile's flare 15 and the center C′ of the light image 15′ is disposed on the horizontal or azimuth axis of the face 26′ of the diaphragm 26 and to the right of the center C of the aperture 27.

The tracking device 16 is constructed and arranged to scan a wide field of view during the time the missile 13 is being acquired by the tracker 16, i.e., the time between the launching of the missile 13 and its appearance within the field of view of the optical system 23, and to scan a relatively narrow field of view after the acquisition of the missile and during its tracking. To these ends, means are provided whereby a magnetic or electric field of varying strength is produced within the image converter tube 24 that is of such a character that during the acquisition stage of operation of the tracker 16 the electron beam E passing through the field is cyclically driven in such a manner that the flare image 15′ moves in a series of decreasing spiral paths about the center C′ and during the tracking stage of operation the electron beam E is driven so that the flare image 15′ rotates a small circular path about the center C′. In short, during acquisition the flare image 15′ moves on the diaphragm 26 in a series of decreasing spiral paths about the center C′ while during tracking it moves in a circular path of constant radius about the center C′.

More particularly, to produce this magnetic field, a first pair of stationary, series-connected, electrical coils 33 and 34 are disposed on opposite sides of the neck 24″ of the image converter tube 24, and in vertical alignment with each other, and a second pair of series-connected electrical coils 35 and 36 are similarly disposed with reference to the neck 24″ of the image converter tube 24 but in horizontal alignment with each other. Thus, the electrical coils 33, 34, 35 and 36 are spaced 90° apart around the image converter tube 24 and in a vertical plane that is normal to the optical axis O–A.

A source of constant frequency, alternating current 37 is connected through a cable 38, a 90° phase shifter 39, a cable 40, an amplitude control 41 and a cable 42 to the vertical or elevation deflection coils 33 and 34. The alternating current source 37 is also connected through a cable 43, the amplitude control 41 and a cable 44 to the horizontal or azimuth deflection coils 35 and 36. The amplitude control 41, which may comprise a motor-driven potentiometer, is so organized and arranged that during the aquisition stage of operation of the tracker 16 a first scanning current of varying amplitude is applied through the cable 42 to the elevation coils 33 and 34 and a second current of similar varying amplitude, but 90° out of phase with the first current, is applied or fed through the cable 44 to the azimuth coils 35 and 36. Due to this energization of the elevation coils 33 and 34 and the azimuth coils 35 and 36, a magnetic field of varying strength is set up in the image converter tube 24 that is of such character that when the electron beam E passes through this field it is driven in a decreasing spiral path so that the image flare 15′ moves in a similar path about the center C′. Moreover, the dimensions of this spiral path are such that its greatest width is substantially equal to the diameter of the diaphragm 26 while its smallest dimension is substantially equal to the diameter of the aperture 27 in the diaphragm 26. Hence the image converter tube 24 is adapted to scan a relatively wide field of view during the acquisition stage of operation of the tracker 16.

The amplitude control 41 is also so organized and arranged that during the tracking stage of operation the scanning currents fed to the elevation coils 33 and 34 and to the azimuth coils 35 and 36 are of constant amplitude. Under these conditions the magnetic field thus produced is effective to drive the electron beam E passing through the image converter tube 24 in such a manner that the flare image 15' moves in a small circle of constant radius about the center C' and on face 26' of the diaphragm 26. The radius of the circle in which the flare image 15' is moving is substantially equal to the radius of the aperture 27 in the diaphragm 26. It is manifest, therefore, that during tracking, the tracker 16 scans a relatively narrow field of view.

It follows from the foregoing, that during the acquisition the flare image 15' moves on the face 26' of the diaphragm 26 in a decreasing spiral path about the center C' during each scanning cycle and hence it will traverse or cut across and pass through the diaphragm aperture 27. When the missile 13 and its flare 15 are displaced in azimuth to the right of the optical axis O–A, as aforesaid, the initial entry and passage of the flare image 15' is at the right side of the diaphragm aperture 27 and the center C' of its spiral path of movement will be disposed on the azimuth or horizontal axis of the diaphragm 26, as viewed in FIG. 3. When this occurs, the light of the flare image 15' passing through the aperture 27 is delivered to a conventional photo-multiplier tube 45 that is mounted in the case 21 directly behind the diaphragm 26 and its central aperture 27 in axial alignment therewith as well as with the optical axis O–A. As a result the photo-multiplier tube 45 "sees" a pulsating light and in response thereto generates an alternating current the phase of which is determined by the initial point of entry of the flare image 15' through the diaphragm aperture 27, and serves as an indication of the direction of displacement of the center C' about which the flare image 15' is moving, relative to the center C of the diaphragm aperture 27 and the optical axis O–A coincident therewith. The alternating current developed by the photo-multiplier tube 45 is fed through a cable 46 to a pre-amplifier 47 the output of which is fed through a cable 48 to a main amplifier 49. In turn, the output of the amplifier 49 is fed through a cable 50 and applied in parallel by cables 51 and 52 to elevation and azimuth demodulators 53 and 54, respectively. The elevation demodulator 53 is connected through a cable 55 with the 90° phase-shifter 39 and the azimuth demodulator 54 is connected through a cable 56 with the cable 43 of the alternating current source 37. In this manner, the same voltages that are applied to the elevation coils 33 and 34 and the azimuth coils 35 and 36 are fed to the elevation and azimuth demodulators 53 and 54, respectively, where they serve as reference voltages to which the output of the photo-multiplier tube 45 is phase compared. The output of the elevation demodulator 53 as well as that of the azimuth demodulator 54 is that of a full wave rectifier. A cable 57 feeds the output of elevation demodulator 53 to a simple low-pass filter network 58 where the ripple is reduced. For the same purpose, the output of the azimuth demodulator 54 is fed through a cable 59 to a simple low-pass filter network 60. The output of the filter network 58 is a direct current voltage that is proportional to the direction of displacement in elevation of the center C' of the spiral path of the flare image 15' to the center C of the aperture 27 in the diaphragm 26. Similarly, the output of the filter network 60 is a direct current voltage but which is proportional to the direction of displacement in azimuth of the center C' of the flare image 15' to the center C of the aperture 27. In effect, therefore, the direct current voltage output of the networks 58 and 60 are proportional to the direction of displacement in elevation and azimuth of the missile 13 relative to the optical axis O–A. Accordingly, these direct current voltages may be termed elevation and azimuth directional error voltages or signals.

The elevation directional error voltage is fed from the filter network 58 through a cable 61 to the cable 42 where it is imposed upon and biases the scanning current being delivered to elevation deflection coils 33 and 34. The azimuth directional error voltage is delivered through a cable 62 to the cable 44 where it is imposed upon and biases the scanning current being fed to the azimuth deflection coils 35 and 36. When the direction error voltages are applied to the scanning currents as aforesaid, their effect on the field produced by the elevation deflection coils 33 and 34 and the azimuth deflection coils 35 and 36 is to alter or change the forces imposed thereby on the electron beam E so as to bend or deflect it in a direction toward the optical axis O–A and thereby align the center C' of the spiral path of the flare image 15' with the center C of the aperture 27 in the diaphragm 26. Since in the present instance, the center C' of the spiral path of the flare image 15' is displaced only in azimuth from the center C of the diaphragm aperture 27 the azimuth demodulator 54 and its associated filter network 60 develop a directional error voltage that is fed through the cable 62 to the cable 44 where it is imposed and biases the scanning current being fed to the azimuth deflection coils 35 and 36. As a result the field produced by the azimuth deflection coils 35 and 36 is now effective to deflect the electron beam E so that the center C' about which the flare image 15' is being driven spirally, is moved along the horizontal axis of the diaphragm 26 toward the center C of the aperture 27.

These directional error voltages are also fed from the cables 61 and 62 to the command computer 17 for conversion into command signals that are transmitted through the radio transmitter 18 to the missile 13 where they are effective to alter the course of the missile 13 to move it in the direction of the optical axis O–A. In the present case, the azimuth directional error voltages developed by the demodulator 54 and the filter network 60 is fed through the cable 62 and is transmitted as aforesaid to the missile 13 where it is effective to alter the course of the missile 13 to move it toward the optical axis O–A.

The output of the photomultiplier tube 45 is also fed through a cable 63 connected to the cable 50 to a relay 64 that is connected through a cable 65 to the amplitude control 41. The relay 64 is so constructed and arranged that in response to some characteristic of the output of the photomultiplier tube 45, e.g., voltage, it is effective to operate the amplitude control 41 in such a manner that the driving currents being fed through the cables 42 and 44 to the elevation deflection coils 33 and 34 and the azimuth deflection coils 35 and 36 respectively are changed from the modulated alternating currents applied during the acquisition to constant amplitude alternating currents. The tracking device 16 then enters its tracking stage of operation.

When the driving currents of constant amplitude are fed to the elevation deflection coils 33 and 34 and the azimuth deflection coils 35 and 36, the electron beam E is driven in a circular path of constant radius, and therefore the flare image 15' moves in a circular path about its center C'. As a result of this, the alternating current output of the photomultiplier tube 45 now becomes a measure of both the direction and magnitude of displacement of the center C' relative to the center C of the diaphragm aperture 27. In other words, the phase and amplitude of the current developed by the photomultiplier tube 45 are proportional to and may be used to indicate, respectively, the direction and magnitude of displacement of the missile 13 relative to the optical axis O–A. Thus, after the output of the photomultiplier tube 45 has been passed through the elevation and azimuth demodulators 53 and 54 and their respective filter networks 58 and 60 the elevation and azimuth directional error voltages fed through the cables 61 and 62 to the command computer 17 are proportional to both direction and magnitude of displacement of the missile 13 relative to the optical axis O–A. These position error voltages are then converted in the command computer 17 into command signals which are fed to and transmitted by the transmitter 18 to the missile 13. In response thereto, the course of the missile 13 is directed into agreement with the optical axis O–A. The position error signals are also fed to the cables 42 and 44 and hence are imposed on the driving currents being fed to the elevation deflection coils 33 and 34 and the azimuth deflection coils 35 and 36 with the end result that the field produced thereby deflects or bends the electron beam E so as to move and maintain the center C′ of the circular path of the flare image 15′ toward and in alignment with the center C of the diaphragm aperture 27.

When the center C′ is coincident with the center C, i.e., when the course of the missile 13 comes into agreement with the optical axis O–A, the photomultiplier tube 45 then "sees" a constant light and its output is then at a constant value. Thus, when the missile 13 is "on course," i.e., when its course is coincident with the optical axis O–A, there is no position or directional error voltages fed from the elevation and azimuth demodulators 53 and 54 to either the missile 13, or the elevation deflection coils 33 and 34 and the azimuth deflection coils 35 and 36. However, if the course of the missile 13 deviates from the optical axis O–A, the center C′ of the flare image 15′ will be displaced from coincidence with the center C of the diaphragm aperture 27. Under these conditions, the photomultiplier tube 45 will "see" a sinusoidal light and generate a current, the phase and amplitude of which will be proportional to the direction and magnitude of displacement of the missile 13 relative to the optical axis O–A. This current will then be fed to the elevation and azimuth demodultors 53 and 54 which in response thereto develop the proper position error voltages for transmission to the missile 13 and for biasing the driving currents delivered to the elevation deflection coils 33 and 34 as well as the azimuth deflection coils 35 and 36 as aforesaid.

What is claimed is:

1. An optical tracking device comprising a closed case having a wall with an opening therethrough, an optical system mounted in said opening and having a fixed field of view about its optical axis, said optical system being adapted to receive light rays from an optically perceptible object within said field of view and to focus the light rays within said case, a diaphragm within said case having an aperture the center of which is coincident with the optical axis of said optical system, an image converter tube in said case constructed and arranged to receive the focused light rays from said optical system and in response thereto to project a light image onto said diaphragm, means associated with said image converter tube for moving the light image in a decreasing spiral path on said diaphragm whereby at some point in its spiral path the light image enters and passes through the aperture in said diaphragm, a photomultiplier tube in said case position to receive the light image passing through said aperture and responsive thereto to generate a voltage the phase of which is proportional to the direction of displacement of the center of the spiral path of movement of the light image relative to the center of said aperture, and means for converting the voltage output of said photomultiplier tube into a signal indicating the position of the object relative to the optical axis.

2. An optical tracking device comprising a closed case having an opening in one wall thereof, an optical system mounted in said opening, said optical system having a fixed field of view about its optical axis and adapted to receive light rays from an optically perceptible object within its field of view and to focus the light rays within the case, a diaphragm mounted within the case and having an aperture the center of which is disposed in axial alignment with the optical axis of said optical system, an image converter tube mounted in said case with its longitudinal axis coincident with the optical axis of said optical system, said image converter tube being organized and arranged to receive the focused light rays from said optical system and in response thereto project a light image onto said diaphragm, electrical means associated with said image converter tube for moving the light image in a decreasing spiral path on said diaphragm whereby the light image enters and passes through said diaphragm aperture, and a photomultiplier tube mounted in said case to receive the light image passing through said diaphragm aperture and responsive thereto to generate a voltage the phase of which is proportional to the direction of displacement of the center of the spiral path of movement of the light image relative to the center of said diaphragm aperture.

3. An optical tracking device comprising an optical system having a fixed field of view about its optical axis and adapted to receive and focus light rays from an optically perceptible object within its field of view, a diaphragm having an aperture the center of which is disposed in axial alignment with the optical axis of said optical system, an image converter tube having its longitudinal axis coincident with the optical axis of said optical system, said image converter tube being organized and arranged to receive the focused light rays from said optical system and in response thereto project a light image onto said diaphragm, electrical means associated with the image converter tube for moving the light image in a decreasing spiral path on said diaphragm whereby the light image enters and passes through said aperture in said diaphragm, and a photomultiplier tube adapted to receive the light image passing through said aperture in said diaphragm and responsive thereto to generate a voltage the phase of which is proportional to the direction of displacement of the center of the spiral path of movement of the light image relative to the center of said aperture in said diaphragm.

4. An optical tracking device comprising an optical system having a fixed field of view about its optical axis and adapted to receive and focus light rays from an optically perceptible object within its field of view, a diaphragm having an aperture the center of which is disposed in axial alignment with the optical axis of the optical system, an image converter tube organized and arranged to receive the focused light rays from the optical system and in response thereto project a light image onto the diaphragm, electrical means associated with the image converter tube for moving the projected light image in a circular path on the diaphragm whereby the light image enters and passes through the aperture therein, and current generating means responsive to the light image passing through the aperture in the diaphragm to generate a voltage the phase and amplitude of which is proportional to the direction and magnitude of displacement of the center of the circular path of movement of the projected light image relative to the center of the aperture in the diaphragm.

5. An optical tracking device comprising an optical system having a fixed field of view about its optical axis and adapted to receive and focus light rays from an optically perceptible object within its field of view, a diaphragm having an aperture the center of which is disposed in axial alignment with the optical axis of the optical system, electronic means organized and arranged to receive the focused light rays from the optical system and in response thereto project a light image thereof onto the diaphragm, electrical means associated with the electronic means for moving the projected light image on said diaphragm whereby the light image enters and passes through the aperture in the diaphragm, and current generating means responsive to the light image passing through the aperture in the diaphragm to generate a voltage the phase and amplitude of which is proportional to the direction and magnitude of displacement of the center of movement of the projected light image relative to the center of the aperture in the diaphragm.

6. An optical tracking device comprising an optical system having a fixed field of view about its optical axis and adapted to receive and focus light rays from an optically perceptible object within its field of view, a diaphragm having an aperture the center of which is disposed in axial alignment with the optical axis of the optical system, electronic means organized and arranged to receive the focused light rays from the optical system and in response thereto project a light image thereof onto the diaphragm, electrical means associated with the electronic means for selectively moving the projected light image either in a decreasing spiral path or in a circular path on said diaphragm whereby the light image enters and passes through the aperture in the diaphragm, and current generating means responsive to the light image passing through the aperture in the diaphragm when the light image is moving in its spiral path to generate a voltage the phase of which is proportional to the direction of displacement of the center of the spiral path of movement of the projected light image with respect to the center of the aperture in the diaphragm, and when the light image is moving in the circular path to generate a voltage the phase and amplitude of which is proportional to the direction and magnitude of displacement of the center of the circular path of movement of the projected light image with respect to the center of the aperture in the diaphragm.

7. An optical tracking device comprising an optical system having a fixed field of view about its optical axis and adapted to receive and focus light rays from an optically perceptible object within its field of view, a diaphragm having an aperture, the center of said aperture being disposed in axial alignment with said optical axis, electronic means organized and arranged to receive the focused light rays from said optical system and in response thereto project a light image thereof onto said diaphragm, electrical means associated with said electronic means for moving the projected light image in a decreasing spiral path on said diaphragm whereby said light image traverses said aperture, and signal generating means responsive to the light image received through said aperture to generate signals the phase of which are proportional to the direction of displacement of the center of the spiral path of the light image with respect to the center of said aperture.

8. An optical tracking device comprising an optical system having a fixed field of view about its optical axis and adapted to receive and focus light rays from an optically perceptible object within its field of view, an apertured diaphragm, the center of said aperture being disposed in axial alignment with said optical axis, means organized and arranged to receive the focused light rays from said optical system and in response thereto project a light image thereof onto said diaphragm, electrical means associated with said electronic means and operative to move the projected light image either in a decreasing spiral path or in a circular path on said diaphragm whereby the light image traverses and passes through said aperture, means responsive to the light image passing through said aperture to generate a voltage, and means responsive to a characteristic of the voltage generated by said voltage generating means to operate said electrical means to vary the path of movement of said light image from a spiral path to a circular path.

9. An optical tracking device comprising a case having a wall with a through opening, an optical system mounted in the opening in said wall and having a fixed field of view about the optical axis thereof, an image converter tube mounted in said case in axial alignment with said optical axis, a diaphragm in said case having an aperture disposed in axial alignment with said optical axis, said optical system being effective to receive light rays from an optically perceptible object within its field of view and to focus said light rays on said image converter tube to thereby actuate said image converter tube to project a light image of said focused light rays onto said diaphragm, elevation and azimuth deflection coils associated with said image converter tube, a source of alternating current, an electrical circuit connecting said alternating current source to said elevation and azimuth deflection coils, said electrical circuit including a 90° phase shifter and a current amplitude control whereby said elevation and azimuth deflection coils are energized with 90° out of phase currents of varying or constant amplitudes, said elevation and azimuth deflection coils being effective to operate said image converter tube when energized by a current of varying amplitude to move said light image in a decreasing spiral path on said diaphragm and when energized by a current of constant amplitude to move said light image in a circular path of constant radius whereby said light image traverses and passes through said aperture, a photomultiplier tube mounted in said case to receive the light image passing through said aperture and responsive thereto to generate a voltage, the phase of said voltage being proportional to the direction of displacement of the center of the spiral path of said light image and to the direction and magnitude of displacement of the center of the circular path of said light image with respect to the center of said aperture, electronic means connected to and receiving the voltage output of said photomultiplier tube, means for supplying 90° out of phase elevation and azimuth reference voltages to said electronic means, said electronic means being organized and arranged to phase compare the output voltage of asid photomultipler tube with said elevation and azimuth reference voltages and to develop voltages proportional to the direction of displacement of the center of the spiral path of said light image with respect to the center of said aperture and proportional to the magnitude and direction of displacement of the center of the circular path of said light image with respect to the center of said aperture, means for applying the voltages developed by said electronic means to the currents energizing said elevation and azimuth deflection coils whereby the center of the path of movement of said light image is moved toward the center of said aperture, and means associated with the current amplitude control and responsive to the output voltage of said photomultiplier tube to change the varying amplitude current to a constant amplitude current.

10. An optical tracking device comprising an optical system having a fixed field of view about its optical axis, an image converter tube in axial alignment with said optical axis, a diaphragm having an aperture disposed in axial alignment with said optical axis, said optical system being organized and arranged to receive light rays from the optically perceptible object within its field of view and to focus said light rays on said image converter tube to thereby actuate it to project a light image of the focused light rays onto said diaphragm, elevation and azimuth deflection coils associated with said image converter tube, means for energizing said elevation and azimuth deflection coils with 90° out of phase currents of varying or constant amplitudes, said elevation and azimuth deflection coils being effective when energized by a current of varying amplitude to operate said image converter tube to move said light image in a decreasing spiral path on said diaphragm and when energized by a current of constant amplitude to move said light image in a circular path on said diaphragm whereby said light image traverses and passes through said aperture, a photomultiplier tube receiving the light image passing through said aperture and responsive thereto to generate a voltage the phase of which, when said light image is moving in a spiral path, is proportional to the direction of displacement of the center of the spiral path relative to the center of said aperture and the phase and amplitude of which, when said light image is moving in a circular path, is proportional to the direction and magnitude of displacement of the center of the circular path relative to the center of the aperture, electronic means connected to and receiving the voltage output of said photomultiplier tube and connected to said elevation and azimuth deflection coils, means for supplying 90° out of phase elevation and azimuth reference voltages to said electronic means, said electronic means being organized and arranged to phase compare the output voltage of said photomultiplier tube with said elevation and azimuth reference voltages and to develop voltages that are applied to the currents energizing said elevation and azimuth deflection coils whereby the center of the path of movement of said light image is moved toward the center of said aperture.

11. An optical tracking device for tracking an optically perceptible object, comprising a case having a wall with a through opening therein, an optical system mounted in the opening in said wall and having a fixed field of view about its optical axis, an image converter tube mounted in said case in axial alignment with said optical axis, a diaphragm in said case having an aperture disposed in axial alignment with said optical axis, said optical system being organized and arranged to receive light rays from the optically perceptible object within its field of view and to focus said light rays on said image converter tube at a point corresponding to the position of the object relative to said optical axis, said image converter tube being responsive to the focused light rays to project a light image thereof onto said diaphragm, the center of said light image corresponding to the position of the object relative to said optical axis, electrical means associated with said image converter tube to move said light image on said diaphragm in a decreasing spiral path or a circular path whereby it traverses said aperture, electronic means including voltage generating means mounted in said case and responsive to the light image passing through said aperture to generate a voltage the phase of which is proportional to the direction of displacement of the center about which the light image is moving to the center of said aperture and means for applying the voltages developed by said electronic means to said electrical means whereby the center of the path about which the light image is moving is moved toward the center of said aperture.

12. An optical tracking device for tracking an optically perceptible object, comprising an optical system having a fixed field of view about its optical axis, an image converter tube in axial alignment with said optical axis, a diaphragm having an aperture disposed in said axial alignment with said optical axis, said optical system being organized and arranged to receive light rays from the optically perceptible object within its field of view and to focus said light rays on said image converter tube at a point corresponding to the position of the object relative to said optical axis, said image converter tube being responsive to the focused light rays to project a light image thereof onto said diaphragm, the center of said light image corresponding to the position of the object relative to said optical axis, electrical means associated with said image converter tube to move said light image on said diaphragm in a circular path whereby it traverses said aperture, electronic means including voltage generating means responsive to the light image passing through said aperture to generate a voltage the phase of which is proportional to the direction and magnitude of displacement of the center about which the light image is moving to the center of said aperture, and means for applying the voltages developed by said electronic means to said electrical means whereby the center of the path about which the light image is moving is moved into coincidence with the center of said aperture.

13. An optical tracking device for tracking an optically perceptible object, comprising a case having a wall with a through opening therein, an optical system mounted in the opening in said wall and having a fixed field of view about its optical axis, an image converter tube mounted in said case in axial alignment with said optical axis, a diaphragm in said case having an aperture disposed in axial alignment with said optical axis, said optical system being organized and arranged to receive light rays from the optically perceptible object within its field of view and to focus said light rays on said image converter tube at a point corresponding to the position of the object relative to said optical axis, said image converter tube being responsive to the focused light rays to project a light image thereof onto said diaphragm, the center of said light image corresponding to the position of the object relative to said optical axis, electrical means associated with said image converter tube to move said light image on said diaphragm in a decreasing spiral path or a circular path whereby it traverses said aperture, and electronic means responsive to the light image passing through said aperture to develop signals proportional to the direction and magnitude of displacement of the center of the light image relative to the center of said aperture.

References Cited in the file of this patent
UNITED STATES PATENTS

| | | |
|---|---|---|
| 2,237,440 | Jones | Apr. 8, 1941 |
| 2,430,975 | Graham | July 16, 1946 |
| 2,581,589 | Herbst | Jan. 8, 1952 |
| 2,734,269 | Claret | Feb. 14, 1956 |
| 2,967,247 | Turck | Jan. 3, 1961 |